April 28, 1953  M. H. PETERSON  2,636,334
AGRICULTURAL IMPLEMENT LIFT SHAFT HELPER SPRING ASSEMBLY
Filed May 10, 1952  4 Sheets-Sheet 2

INVENTOR.
MERLE H. PETERSON.
BY Alden D. Redfield.
ATTORNEY.

April 28, 1953  M. H. PETERSON  2,636,334
AGRICULTURAL IMPLEMENT LIFT SHAFT HELPER SPRING ASSEMBLY
Filed May 10, 1952  4 Sheets-Sheet 3

INVENTOR.
MERLE H. PETERSON.
BY
Alden D. Redfield
ATTORNEY.

Patented Apr. 28, 1953

2,636,334

UNITED STATES PATENT OFFICE 2,636,334

AGRICULTURAL IMPLEMENT LIFT SHAFT HELPER SPRING ASSEMBLY

Merle H. Peterson, Grafton, Wis., assignor to Avco Manufacturing Corporation, Cincinnati, Ohio, a corporation of Delaware Application May 10, 1952, Serial No. 287,104

5 Claims. (Cl. 56—276)

This invention relates in general to farm equipment which uses a tool lift arrangement, and more specifically a helper spring device suitable for use with farm equipment of this type.

In agricultural devices it is customary to raise and lower the working implement by rotation of a lift shaft to which the implement is connected through a system of linkages and bell crank arms. Hydraulic means or some other power-driven type of device may be provided for rotation of the lift shaft or it may be rotated manually by an attached lever arm. Although not limited thereto, it is with manually operated agricultural implement lifting systems that this invention is primarily concerned.

It is a well-known expedient to use a tension spring connected between the manual lift lever arm and an anchor point on the implement frame for applying a force to the lift arm which is proportional to the length of spring extension. As the implement is lowered into operating position the tension spring extends more and more to supply an ever-growing force in support of the implement until finally the implement weight floats entirely on the tension spring. Obviously, as the implement is moved toward the operating position and the force supplied by the tension spring increases, the necessary manually applied force decreases.

During lifting operation the reverse is true and the amount of necessary manually applied force increases as the lift position is approached. True, very little manual force is required to start the implement toward its lift position; however, as the implement moves away from the operating position the tension spring contracts and supplies an ever-decreasing force in support of the implement. As a result, the necessary manually applied force must grow larger and larger as the implement is brought into lift position. It would be desirable to decrease the amount of this necessary manually applied force and at the same time allow the implement to float against the force of the tension spring when in the operating position.

Therefore it is an object of this invention to provide a helper spring assembly which acts during lift and lowering operations but which does not supply any portion of the float spring force during operation.

It is a further object of this invention to provide a helper spring assembly for an implement lifting shaft which does not supply a lifting direction force moment when the implement is in the operating position.

It is also a further object of this invention to provide a lift shaft helper spring assembly for a farm implement wherein the helper spring applies lifting force to the lift assembly only after the manual lift lever has been moved from its operating position toward its lift position.

Briefly considering a preferred embodiment of the invention, there is provided a ground supported farm implement carrying frame having a lift shaft mounted thereon for rocking movements between a rest position and a lift position. A system of linkages and bell crank arms connect the lift shaft to the working implement so as to raise and lower the implement as the lift shaft is rocked between its two maximum rotational positions. In addition, there is provided a novel helper spring assembly including a first toggle arm having one end attached to the lift shaft. Between the free end of the first toggle arm and a frame mounted pivot point there is connected a piloted spring which forms a second toggle arm. These two toggle arms are positioned relative to each other and relative to the rotational position of the lift shaft so that the toggle arms are in alignment only when the lift shaft is rotated slightly away from the rest position. In one preferred embodiment a compression spring was used for the second toggle arm and the toggle arms when aligned assumed a 180° relationship.

For a better understanding of the present invention, together with other and further objects, advantages and capabilities thereof, reference is made to the following disclosure and appended claims, in connection with the accompanying drawings in which:

Figure 1:
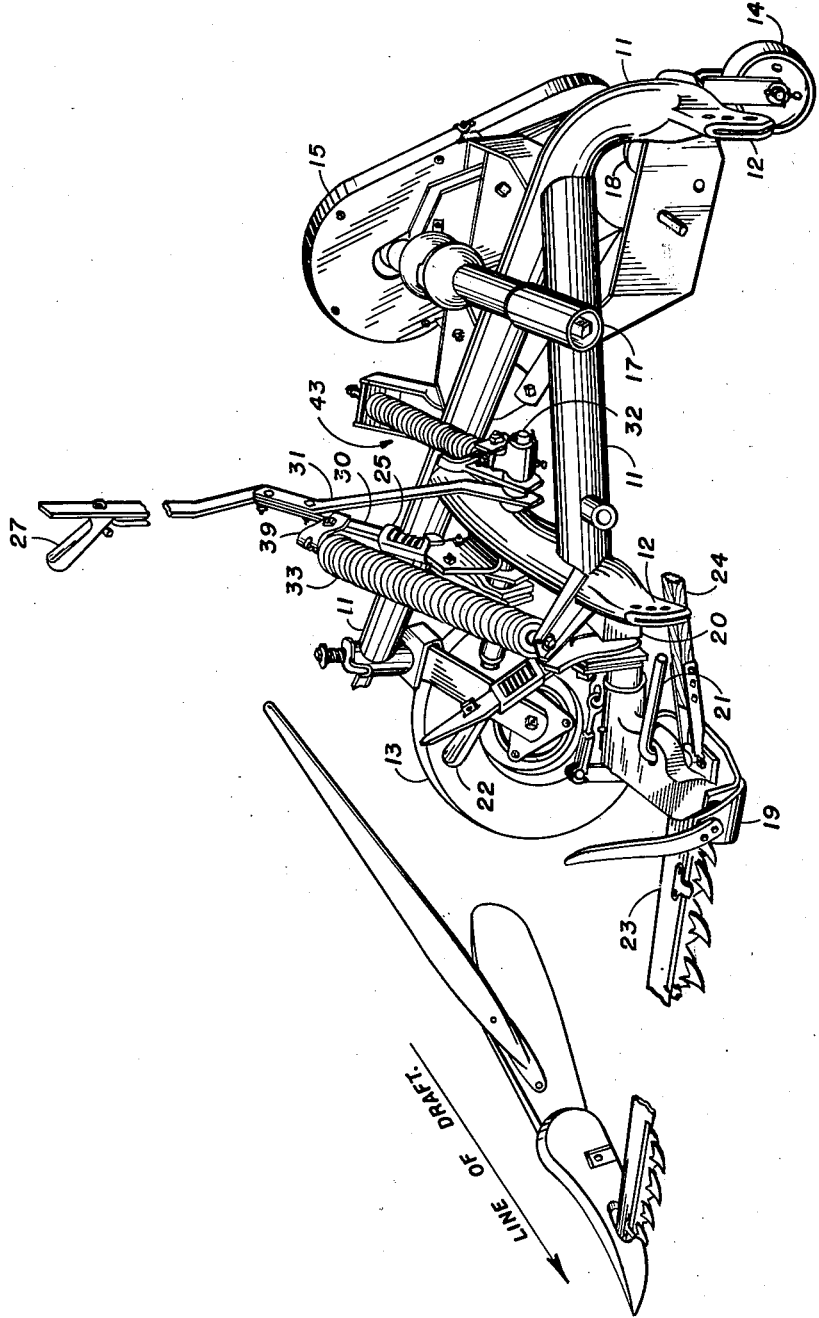
Fig. 1 shows a semi-mounted mower having a manual lift system including the novel helper spring assembly.

As an aid to full appreciation and understanding of the structure involved there is shown, in Fig. 1, a semi-mounted mower supporting frame 11 of the tubular type having a plurality of openings 12 provided at the hitch end for connection to tractor draw bar assemblies of various heights. The rear or trailing end of the mower frame 11 is supported by a single caster wheel 13 shown positioned transverse to the line of draft along which it rolls when the implement is being towed behind a prime mover such as a tractor. Retractable wheel 14 is used only for parking and tractor attaching operations.

Housing 15 covers a belt drive system which is powered through telescoping drive shaft 17 to drive fly-wheel 18. Cutter shoe 19 is supported from frame 11 by push bar 20 and pull rod 21, portions of which have been deleted from the drawing in order to clearly show the remainder of the structure. Lever 22 along with the conventionally positioned elements shown connected thereto provide means for tilting cutter shoe 19 and cutter bar 23. Pitman rod 24 is conventionally connected between cutter-bar 23 and fly-wheel 18, through a part of the pitman rod has been deleted so that the remainder of the structure can be clearly shown.

Figure 2:
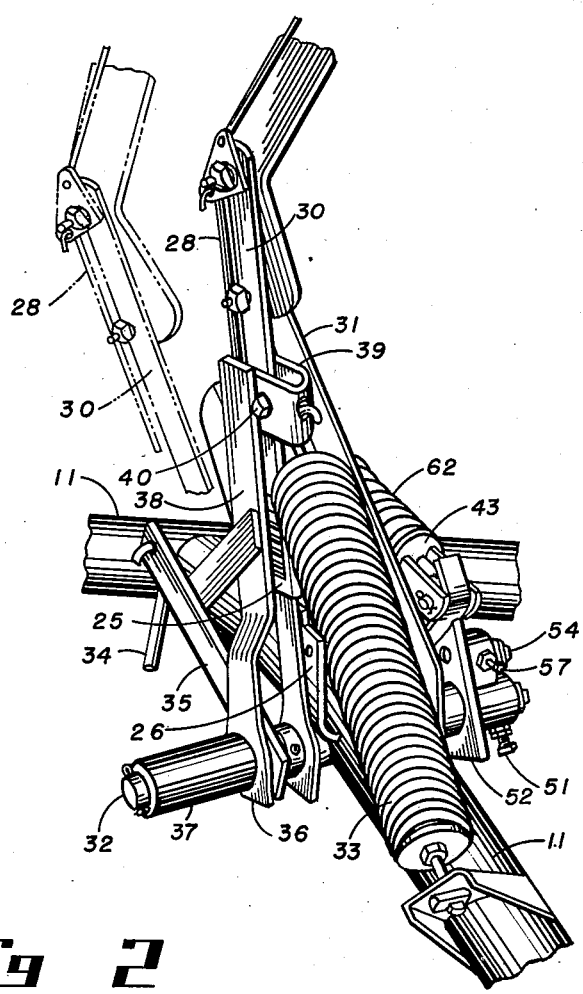
Fig. 2 shows the manual lift system including the lift shaft.

Lift lever arm 30 along with the lever arm brace 31 act in conjunction with lift shaft 32 and tension spring 33 to lift cutter-bar 23 through a system of bell-crank arms and linkages, best shown in Fig. 2. Lift arm latch 25 which is mounted so as to slide up and down lift arm 30 provides means for positioning lift arm 30 relative to a lever sector plate 26 integrally attached to frame 11. Latch lifting lever 27 along with the linking latch wire 28 is used to raise the lift arm latch along lift arm 30 and out of engagement with sector plate 26 whenever it is desired to rotate the lift shaft between positions, i. e., rest and lift positions.

Implement lift link 34 is connected to arm 35 of bell crank 36. Tubular bearing sleeve 37 is integrally attached to bell crank 36, providing a bearing surface upon which the bell crank can rotate freely around lift shaft 32. At the free end of crank arm 38 an integrally attached U-shaped gag member 39 is provided to which one end of tension spring 33 is connected. Lever arm 30, which is attached to rotate lift shaft 32 is so positioned relative to gag member 39 as to strike stop bolt 40 as the lift shaft is rotated toward the lift position. After lift lever 30 strikes the gag member stop bolt 40, lever arm 30 and crank arm 38 move as a unit through the remainder of the lift cycle and the forces applied to lift shaft 32 by lift lever 30 and helper spring assembly 43, yet to be described, are transferred through bell crank 36 and lift link 34 to bring the implement into lift position. In other words, the weight of the implement acting on bell crank 36 holds gag stop bolt 40 against the forward edge of lift lever arm 30 during lift operations.

As the lift lever 30 is rotated back from lift position toward operating position, these same forces oppose the weight of the implement until tension spring 33 is extended sufficiently to apply a force to crank arm 38 which completely neutralizes the force applied to crank arm 35 by the implement, through link 34. At this point bell crank 36 ceases to rotate with lift shaft 32. As lift lever 30 is moved farther back along sector plate 26 toward the stop bolt 41, lift lever 30 ceases to engage gag member stop bolt 40, thereby causing crank arm 38 and lift lever 30 to separate, as shown by the dotted line portion of Fig. 2, causing the weight of the implement to float against the force supplied to crank arm 38 by tension spring 33. Thus, lever 30 assumes a normal operating position against lever sector stop bolt 41 separated from crank arm 38, leaving bell crank 36 free to rotate around lift shaft 32 on sleeve bearing 37 and transfer the weight of the implement to tension spring 33.

Figure 3:
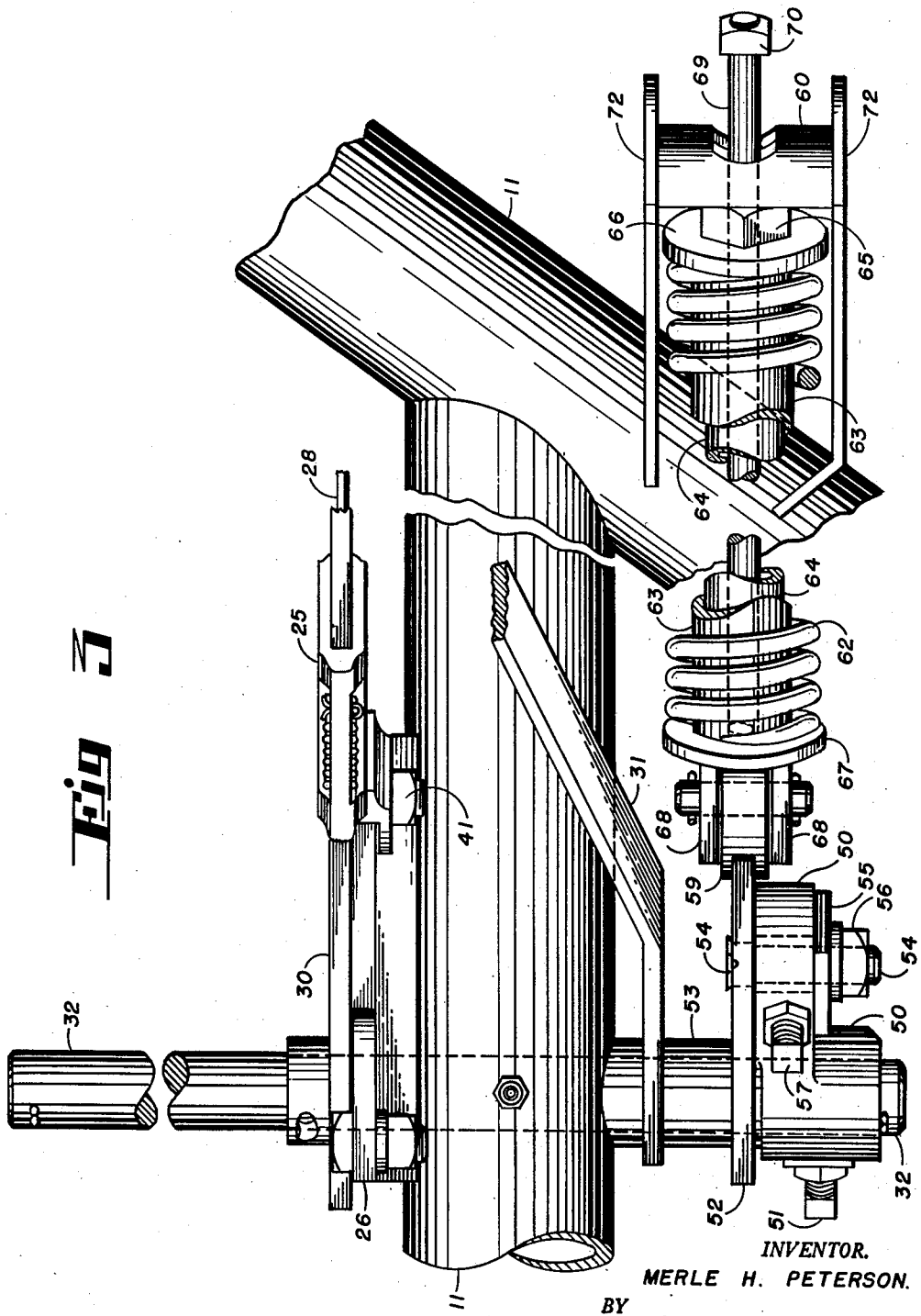
Fig. 3 shows a plan view of the helper spring assembly.
Figure 4:
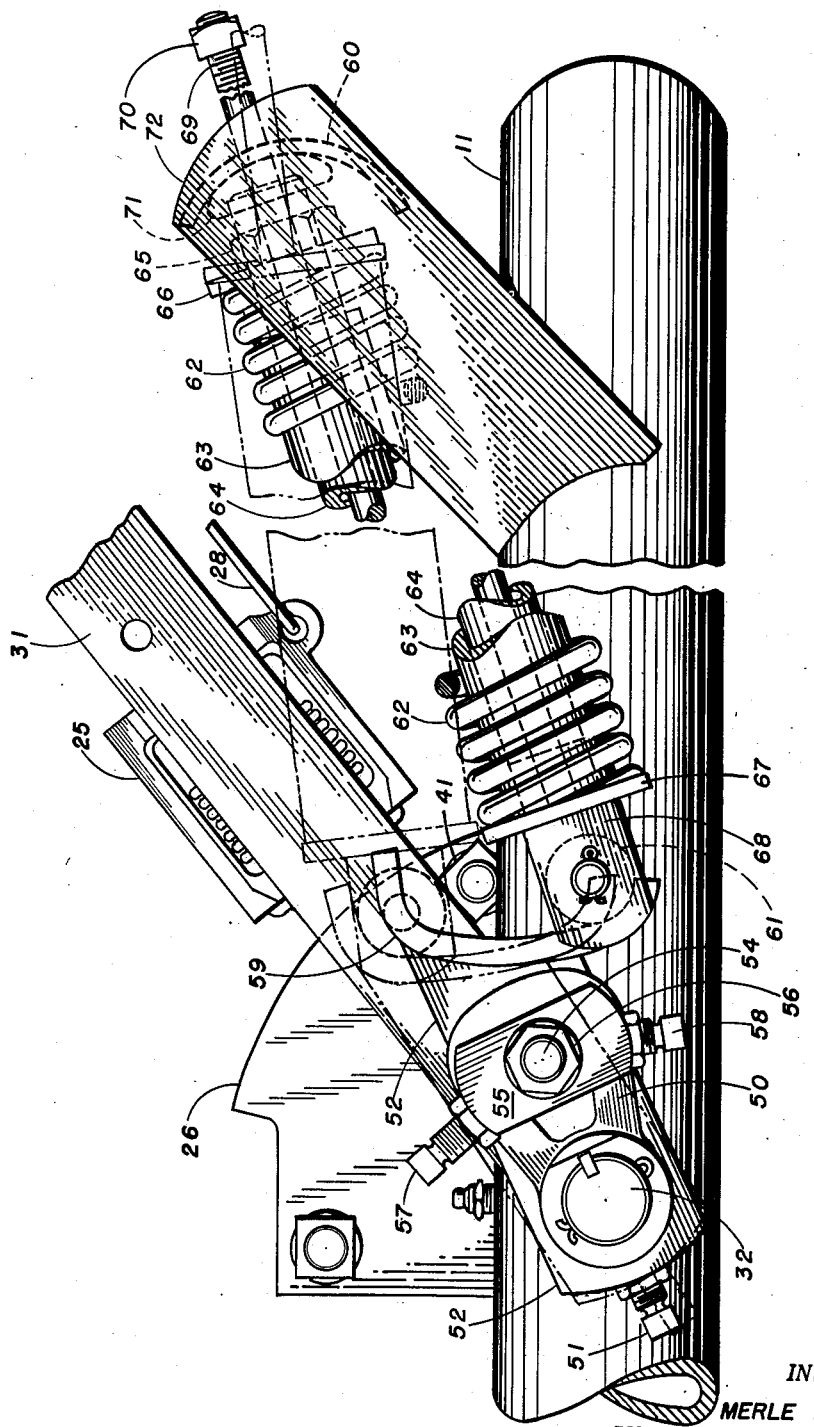
Fig. 4 shows a stubbleward side view of the helper spring assembly.

Now considering helper spring assembly 43 shown generally in Figs. 1 and 2, and more specifically in Figs. 3 and 4, it will be seen that bell crank 50 is keyed to lift shaft 32 and held in position thereon by means of a set screw 51. A cam arm 52 is loosely mounted on lift shaft 32 between bell crank 50 and a tubular sleeve bearing 53 integrally attached to lift arm brace member 31.

Cam arm 52 is held from rotational movements around lift shaft 32 by the action of stud 54 and set screws 57 and 58 mounted on the arms of bell crank 50. As can be seen in Fig. 3 and Fig. 4, stud 54 extends through cam arm 52, between the two arms of bell crank 50 and through cam plate 55, and is threaded to receive a lock washer and nut 56 which, when tightened, secures cam arm 52 to bell crank 50. The longitudinal axis of cam arm 52 is positioned relative to the arms of bell crank 50 by means of set screws 57 and 58. For example, assuming the lock washer and nut 56 to be loose, a loosening of set screw 58 and a tightening of set screw 57 moves the longitudinal axis of cam arm 52 closer to alignment with the lower arm 59 of bell crank 50. On the other hand, when set screw 57 is loosened and set screw 58 tightened the longitudinal axis of cam arm 52 moves closer to alignment with the other arm of bell crank 50. Thus, since bell crank 50 is keyed to lift shaft 32, adjustment of set screws 57 and 58 actually shifts the rotational position of cam arm 52 around lift shaft 32, and the lock-washer nut 56 combination provides means for holding cam arm 52 in the adjusted position.

The free end of cam arm 52 is integrally attached to an arcuate shaped member 59 which provides a cam surface against which, as will be seen, the roller portion of the spring toggle arm bears. Thus it can be said that cam arm 52, along with bell crank 50, stud 54, cam plate 55, and nut 56 form what can be called a first toggle arm.

The second toggle arm is formed by a guided compression spring assembly which applies a force between pivot bearing plate 60 and a cam roller 61 which bears against the concave face of cam 59. Compression spring 62 is guided by a telescoping arrangement comprising an outer tubular sleeve 63 and a sliding inner tubular sleeve 64. The inner tubular sleeve 64 is threaded at its pivot end to receive spring compression adjusting nut 65 which acts as an adjustable stop for washer 66.

The outer tubular sleeve 63 is integrally attached to one side of a circular flange member 67 and roller 61 is mounted for rotation between two ears 68 which are integrally attached to the other side of the same circular flange member. Guide rod 69 is also integrally attached to circular flange member 67, to form a central axis for the complete spring guide assembly. The other end of guide rod 69 is threaded to receive a stop nut 70. Compression spring 62 slides over tubular sleeve 63 and is held between washer 66 and circular flange 67. An arcuate shaped pivot plate 71 is mounted to slide on guide rod 69 between the threaded end of the inner tubular sleeve 64 and the pivot bearing plate 60. Pivot bearing plate 60 is rigidly attached to frame 11 by side anchor plates 72.

The position of cam arm 52 relative to lift shaft 32 is critical. When lift arm 30 rests against the lower lever sector stop bolt 41 the implement is in operating position and cam arm 52 should be fixed on lift shaft 32 so that roller 61 is in its lowest position on the concave surface of cam 59. Also, the longitudinal axis of stud 54, which connects cam arm 52 to bell crank 50, should lie in or relatively close to the plane bisecting the angle between the arms of bell crank 50 so that set screws 57 and 58 have approximately equal up and down adjustment travel at this critical point.

The action of the cam-faced first toggle arm and the guided compression spring second toggle arm, after they are once correctly positioned, depends upon the rotational position of lift shaft 32. As has been stated, when the implement is in operating position lift lever 30 rests against lever sector stop bolt 41, and cam roller 61 is in its lowest position on the concave surface of cam 59. It will be noted that in this position the force applied by compression spring 62 tends to rotate lift shaft 32 toward the operating position, i. e., drive lever arm 30 against lever sector stop bolt 41. In other words, the force supplied by compression spring 62 has a component which tends to drive lever cam 52 in a clockwise direction looking at the cam from the side shown in Fig. 4.

As lift lever arm 30 is moved toward the lift position, thereby rotating lift shaft 32 in a counterclockwise direction, cam arm 52 and cam 59 move from the solid line position shown in Fig. 4 toward the dotted line position. As lever arm 30 approaches contact with gag stop bolt 40, roller 61 moves up the concave face of cam 59 until the toggle arms are in alignment and compression spring 62 applies its full force through cam arm 52, transversely to the axis of lift shaft 32. When lever arm 30 strikes gag stop bolt 40, roller 61 reaches its uppermost position on the surface of cam 59 and exerts a component of force through cam arm 52 tending to rotate lift shaft 32 toward the lift position. It can now be seen, during the remainder of the lift operation, that the force of compression spring 62 is applied through lift shaft 32 to carry a portion of the implement's weight.

When it is desired to lower the implement from the lift to the operating position, the latch lifting lever 27 is actuated to move lift arm latch 25 up along lift arm 30 and out of engagement with lever sector plate 26. The weight of the implement then acting through implement lift link 34 and bell crank 36 tends to rotate lift shaft 32 in a clockwise direction when viewed from the side shown in Fig. 4. At this position guided compression spring 62 and tension spring 33 both exert a force on lift shaft 32 which opposes the weight of the implement, requiring only a small additional manually applied force against the free end of lever arm 30. As lift shaft 32 is rotated farther toward the operating position, tension spring 33 extends and accepts an ever-growing portion of the implement's weight.

When the force applied by tension spring 33 through bell crank 36 exactly neutralizes the weight of the implement applied to crank arm 35 through lift link 34, bell crank 36 ceases to rotate with lift shaft 32 and as lift shaft 32 continues to rotate toward the operating position, lift lever arm 30 breaks out of engagement with gag stop bolt 40 and moves back toward stop bolt 41, as shown by the dotted line portion of Fig. 2. The weight of the implement then floats against the force applied by tension spring 33. At this point cam face 59 has rotated to a position similar to that shown by the dotted lines in Fig. 4, and as lift shaft 30 moves still farther toward lever sector stop bolt 41, roller 61 starts moving downward over the face of cam 59 in toggle action, coming to rest at the lowermost portion of the cam face just before lift lever 30 strikes stop bolt 41. When roller 61 is in this position the force of compression spring 62 is applied to hold lever arm 30 against lever sector stop bolt 41 out of engagement with gag stop bolt 40.

It can now be seen that helper spring assembly 43 actually comprises two toggle arms with cam arm 52, bell crank 50, stud 54, cam plate 55 and nut 56 forming an assembly making up the first toggle arm. Guided compression spring 62 held between roller 61 and pivot anchor plate 60 forms the second toggle arm.

It now also can be seen that helper spring assembly 43 is only effective to help neutralize the weight of the implement during lift operation periods and does not supply a lifting direction force-moment when the implement is in the operating position. It can be seen further that the helper spring assembly 43 applies a lift force to aid in lifting the implement only after manual lift lever 30 has been moved from its operating position toward its lift position.

While the compression spring type helper spring assembly which has been shown and described is at present considered the preferred embodiment of the invention, it will be obvious to those skilled in the art that various changes and modifications may be made therein without departing from the scope of the appended claims.

Having thus described my invention, I claim:

1. In a farm tool the combination comprising a ground supported frame, a lift shaft supported on said frame for rocking movements between a rest position and a lift position, a lever arm for rocking said shaft between the rest and lift positions, a helper spring assembly comprising a first toggle arm having one end connected to said shaft, a piloted spring compressed between the other end of said first toggle arm and a frame mounted pivot point forming a second toggle arm, said toggle arms being in 180° alignment only when said lift shaft is rocked to a position slightly away from the rest position.

2. In a farm tool the combination comprising a ground supported frame, a lift shaft supported on said frame for rocking movements between a rest position and a lift position, a lever arm for rocking said shaft between the rest and lift positions, a helper spring assembly comprising a first toggle arm having one end connected to said shaft, a second toggle arm comprising a piloted spring connected between the other end of said first toggle arm and a frame mounted pivot point for applying force against said first toggle arm, said toggle arms being aligned only when said lift shaft is rocked to a position slightly away from the rest position.

3. In a farm tool the combination comprising a ground supported frame, a lift shaft supported on said frame for rocking movements between an operating position and a lift position, a lever arm for rocking said shaft between the operating and lift positions, a helper spring assembly comprising a first toggle arm having one end formed to provide a cam surface and the other end connected to said shaft, a second toggle arm comprising a piloted spring compressed between a frame mounted pivot point and a cam roller which bears against the said cam surface, said toggle arms being in 180° alignment only when said lift shaft is rocked slightly away from the operating position.

4. In a farm tool the combination comprising an implement frame supported by ground engaging means, a frame mounted implement lifting shaft for rotation between an implement operating position and an implement lift position, a first toggle arm having one end connected to said lift shaft, a second toggle arm comprising a guided compression spring held between a frame mounted pivot point and the other end of said first toggle arm, the longitudinal axes of said arms lying in a common plane transverse to the axis of said lift shaft when in alignment, said toggle arms being in line only when said lift shaft is turned slightly from operating position, whereby said compression spring applies a force to aid in rotating said lift shaft into lift position from a position where the toggle arms are in alignment and also a force tending to hold said lift shaft from being rotated from the operating position to the position where said toggle arms are in alignment.

5. In a farm tool the combination comprising a ground supported frame, a lift shaft supported on said frame for rocking movement between an operating position and a lift position, a float spring having two ends, one of said float spring ends being anchored to said frame, a farm implement, a bell crank mounted to rotate around said lift shaft having a first arm linked to said farm implement and a second arm supporting a U-shaped gag member and connected to the free end of said float spring, a lever arm for rocking said lift shaft between the operating and lift positions mounted on said lift shaft for engaging said U-shaped gag member, a helper spring assembly comprising a first toggle arm having one end formed to provide a cam surface and the other end connected to said shaft, a second toggle arm comprising a piloted spring compressed between a frame mounted pivot point and a cam roller which bears against the cam surface of said first toggle arm, said first and second toggle arms being in alignment only when said lift shaft is rocked slightly away from the operating position.

MERLE H. PETERSON.

No references cited.